Patented Apr. 14, 1942

2,279,439

UNITED STATES PATENT OFFICE 2,279,439

LACQUER COMPOSITION

Walter D. Bowlby, Allentown, Pa., assignor to Trojan Powder Company, Allentown, Pa.

No Drawing. Application September 30, 1938, Serial No. 232,532

1 Claim. (Cl. 260—9)

This invention relates to compositions containing nitrostarch and polyvinyl acetal acetate and, more particularly, to lacquers comprising such a composition.

An object of the invention is to prepare a nitrostarch lacquer that retains a good color on aging and that gives a practically colorless film of high transparency and gloss which preserves these desirable properties on aging.

Other objects and advantages of the invention will appear from the description that follows.

Although various nitrostarch and resin compositions have been proposed for use in lacquers, up to the time of my invention there had been found no combination of nitrostarch and a compatible thermo-plastic resin that gave a film of satisfactory strength and hardness.

The resins which I use with nitrostarch for the present purpose are the polyvinyl acetal acetate resins, such as those sold under the name of "Alvar." I have discovered that nitrostarch and polyvinyl acetal acetate yield a quick-drying lacquer, having substantially the transparency and lack of color of a polyvinyl acetal acetate film and drying in a much shorter period of time than polyvinyl acetal acetate lacquer will dry in the absence of nitrostarch. Furthermore, the vinyl acetal acetate clears the slight haze that ordinarily is found in nitrostarch films, and in this respect differs from other resins.

In the practice of my invention, I may use any suitable solvent for the nitrostarch and polyvinyl acetal acetate resin. Thus, I may use a vehicle of about the following composition:

| | Per cent |
|---|---|
| Ethyl acetate | 2–5 |
| Butyl acetate | 25–60 |
| Butyl ether of ethylene glycol | 2–5 |
| Butyl alcohol | 3–10 |
| Toluene | 10–35 |
| Xylene | 5–21 |
| Petroleum naphtha | 5–15 |
| Total | 100 |

Proportions in the above table are expressed as parts by volume. Elsewhere herein proportions are expressed as parts by weight.

The proportions of the several ingredients of the solvent vehicle or medium should be so selected as to make the final mixture a solvent for the nitrostarch and resin used. For this reason, I prefer to have present in the solvent mixture 45% to 60% of ingredients that alone are active solvents for nitrostarch, as, for example, esters, ketones, and/or alcohol-ester mixtures.

Using such a vehicle, I make lacquers containing, for example, 15 to 35 parts of solids or film-forming ingredients for 100 parts of lacquer. An example of my invention is the following lacquer:

| | Parts |
|---|---|
| Solvent vehicle | 70 |
| Vinyl acetal acetate | 18 |
| Nitrostarch | 9 |
| Plasticizer | 3 |

The low proportion of nitrostarch is conducive to clarity of the composition.

Although the use of a plasticizer is not entirely necessary for all purposes, it is desirable. Such plasticizers as tricresylphosphate, triacetin, and dibutyl or diamyl phthalates are satisfactory.

The nitrostarch used may be of any commercial grade. I have used to advantage a nitrostarch of degree of nitration corresponding to about 13% nitrogen.

A suitable resin is made by a process including partially hydrolyzing vinyl acetate and then treating with aldehyde, to form the acetal acetate. For best results, I use a vinyl acetal acetate having about 70 to 80 per cent of the acetate radical (of vinyl acetate) replaced by acetal groups and having a softening point, by the Kraemer and Sarnow method, of about 70° to 120° C.

I prefer that the resin be of relatively low viscosity, to avoid "cob-webbing," that is, forming many hair-like strands or spraying rather than a fine mist. Furthermore, low viscosity polyvinyl acetal acetate is more compatible with nitrostarch, under certain conditions of use, than the high viscosity grades. I have used to advantage vinyl acetal acetate that, in a solution of 20 parts by weight of the resin to 80 parts of toluol, has a viscosity of 20 to 200 centipoises.

When no resin other than polyvinyl acetal acetate is used, the proportion of the resin is preferably about 10% to 25% of the total weight of the finished lacquer, and nitrostarch, as an agent to hasten or facilitate the drying of the film, 3% to 15% of the total weight of the lacquer. The plasticizer of the kind described above, should not exceed 5% of the total weight of the lacquer and is preferably about 10% of the film-forming ingredients. I prefer to use from 15% to 35% of the film-forming ingredients for 65 parts to 85 parts of the volatile solvent vehicle. For best results, the nitrostarch is in excess of one-fourth but is not in excess of onehalf of the amount of polyvinyl acetal resin present.

With my improved lacquer I obtain films having the unique and valuable properties of being quick-drying, as compared with similar films free from nitrostarch, while being practically colorless, transparent, and clear. The nitrostarch gives to the film increased water resistance, less tendency to "cob-web" on spraying, and greater susceptibility to polishing than is the case if the film contains the vinyl acetal acetate resin in the absence of nitrostarch. On the other hand, the use of the said resin so bodies up a nitrostarch lacquer, by itself very low in viscosity for certain suitable concentrations, as to give a suitable spraying viscosity, such as 85 centipoises or so, for a lacquer composition relatively low in film-forming ingredients. I may obtain this viscosity with a total concentration of nitrostarch and polyvinyl acetal acetate not in excess of 30 parts to 100 parts of the lacquer, when no substantial amount of other resin is present.

To replace a portion of the polyvinyl acetal acetate and/or all or part of the plasticizer, there may be used a soft resin, as, for example, very slowly flowable alkyd resins, resinous toluene sulfonamide, or a relatively soft and compatible urea-aldehyde condenastion product. As the alkyd resin, there may be used the resinous esterification product of a polybasic acid and a polyhydric alcohol, modified, if desired, by the inclusion of the acid of a drying or non-drying oil. Such a resin may be made from phthalic anhydride, glycerol and linseed or cocoanut oil fatty acids. The proportion of the alkyd resins should be not in excess of the combined weight of the nitrostarch and vinyl acetal acetate resin, say 5% to 80% of the said combined weight. When the soft resin is used, the vinyl acetal acetate acts in conjunction with the nitrostarch to assist in solvent removal and hasten the rate of drying of the film.

An example of a lacquer containing a soft resin is the following:

| | Parts |
|---|---|
| Nitrostarch | 5–15 |
| Polyvinyl acetal acetate | 5–15 |
| Soft synthetic resin | 5–15 |
| Volatile solvent vehicle to give concentration desired | |

The preferred proportion is approximately equal weights of nitrostarch, vinyl acetal acetate, and soft resinous material.

Also, there may be used a synthetic resin that is relatively hard, provided there be incorporated also a plasticizer, to plasticize to the extent desired. When such a hard resin is used, its proportion may be increased, say, to 80% of the weight of the said resin, nitrostarch, and polyvinyl acetal acetate.

In all my lacquers, the total proportion of the film-forming ingredients (non-volatile) is so adjusted as to give a composition suitable for brushing, spraying, or dipping, either with the solvent present or after thinning with additional solvent.

If the solvent medium or the major portion thereof is omitted, compositions of the kind described may be used as molding material of low cold-flow characteristics. Such material may be pressed to shape in seam-heated dies at a temperature not appreciably above 120° C.; after being pressed, the composition is cooled.

The compositions in the presence of the volatile solvent medium may be used as an adhesive, the base for a printing ink, finger nail lacquer, primer for wood or metal objects, or finishing lacquer for paper, stencils, furniture and other objects to be kept indoors.

For a spray lacquer for furniture, for instance, I have used to advantage the following composition:

| | Parts |
|---|---|
| Nitrostarch | 5.5 |
| Vinyl acetal acetate ("Alvar" 4/80) | 14.5 |
| Tricresyl phosphate | 3.2 |
| Butyl acetate | 38.0 |
| Toluol | 38.8 |
| Total | 100.0 |

As a finger nail lacquer I may use the following:

| | Parts |
|---|---|
| Nitrostarch | 6.0 |
| Vinyl acetal acetate (9.3 parts "Alvar" 4/80 to 6.3 parts "Alvar" 2.5/70) | 15.6 |
| Dibutyl phthalate | 1.9 |
| Iron oxide (red), as pigment | 1.0 |
| Titanium dioxide, as pigment | 1.5 |
| Volatile solvent | 74.0 |
| Total | 100.0 |

As a finger nail lacquer, my improved compositions are particularly desirable and outstanding. They give films of high gloss that are hard and durable, the preferred formula being substantially that given in the immediately preceding table. The nail lacquer is to be applied by brushing and should be about 200 centipoises in viscosity.

As stated previously, the vinyl acetal acetate clears the slight haze ordinarily found in nitrostarch films, to give a substantially clear lacquer solution.

It will be understood that my composition contains the nitrostarch and vinyl acetal acetate in homogeneously blended condition, that is, dissolved or colloided in each other, and that there may be present pigments and other admixtures that are conventional in lacquers and lacquer enamels.

It will be understood, also, that the details given are for the purpose of illustration, not restriction, and that variations within the spirit of the invention are intended to be included in the scope of the appended claim.

I claim:

A lacquer comprising nitrostarch, a polyvinyl acetal acetate resin having a low viscosity of 20 to 200 centipoises in a solution containing 20 parts of the resin in 80 parts of toluol, and a volatile solvent medium for the nitrostarch and resin, the composition including the resin of low viscosity giving on spraying and subsequent drying a film that is free from hair-like strands and the proportions of the several materials being about as follows: Nitrostarch 3 to 15 parts; polyvinyl acetal acetate resin 10 to 25 parts; plasticizer in amount not substantially in excess of 5 parts for 100 parts of the lacquer.

WALTER D. BOWLBY.